(12) United States Patent
Szkopek et al.

(10) Patent No.: US 6,711,334 B2
(45) Date of Patent: Mar. 23, 2004

(54) MULTIMODE FIBER FOR NARROWBAND BRAGG GRATINGS

(75) Inventors: Thomas Szkopek, 3739 Clarington Ave. Apt. #24, Los Angeles, CA (US) 90034; Peter W. E. Smith, 77 Avenue Road Unit 306, Toronto, Ontario (CA), M5R 3R8; John Edward Sipe, 45 Carlton Street Suite 1217, Toronto, Ontario (CA), M5B 2H9

(73) Assignees: Thomas Szkopek, Los Angeles, CA (US); Peter W. E. Smith, Toronto (CA); John Edward Sipe, Toronto (CA)

(*) Notice: Subject to any disclaimer, the term of this patent is extended or adjusted under 35 U.S.C. 154(b) by 0 days.

(21) Appl. No.: 10/146,132

(22) Filed: May 16, 2002

(65) Prior Publication Data

US 2002/0186945 A1 Dec. 12, 2002

Related U.S. Application Data

(60) Provisional application No. 60/290,995, filed on May 16, 2001.

(51) Int. Cl.$^7$ .............................. G02B 6/00; G02B 6/02; G02F 1/295
(52) U.S. Cl. ........................ 385/127; 385/10; 385/147
(58) Field of Search ................. 385/10, 39, 125–127, 385/147

(56) References Cited

U.S. PATENT DOCUMENTS

| | | | | |
|---|---|---|---|---|
| 4,184,859 A | * | 1/1980 | Maklad | 385/125 |
| 4,360,371 A | * | 11/1982 | Blakenship | 385/125 |
| 4,465,336 A | * | 8/1984 | Huber et al. | 385/125 |
| 4,549,781 A | * | 10/1985 | Bhagavatula et al. | 385/125 |

OTHER PUBLICATIONS

Cylindrical Bragg Fibers: A Design and Feasibility Study for Optical Communications; N. J. Doran and K. J. Blow; 0733–8724/83/1200–0588$01.00 1983 IEEE; pp. 588–590.

Bragg Gratings in Multimode and Few–Mode Optical Fibers; Toru Mizunami, et al.; Journal of Lightwave Technology, vol. 18, No. 2, Feb. 2000; pp. 230–235.

Single–Mode Behavior of a Circular Grating for Potential Disk–Shaped DFB Lasers; Minoru Toda; IEEE Journal of Quantum Electronics, vol. 26., No. 3, Mar. 1990; pp. 473–481.

Guiding Optical Light in Air Using an All–Dielectric Structure; Yoel Fink et al.; Journal of Lightwave Technology, vol. 17, No. 11, Nov. 1999; pp. 2039–2041.

* cited by examiner

Primary Examiner—Akm Enayet Ullah
(74) Attorney, Agent, or Firm—Lynn C. Schumacher; Hill & Schumacher

(57) ABSTRACT

A novel multimode fiber structure with modal propagation characteristics tailored to facilitate the creation of narrowband, high reflectivity, fiber Bragg gratings is disclosed. The fiber structure comprises concentric cylindrical shells of higher and lower refractive index material. A full vector, second order finite element method is used to analyze the proposed multimode fiber structure. Simulations of the modal profiles show that high order modes are localized to particular high refractive index shells. We present the theoretical characterization of the modal propagation constant as a function of inner shell radius, shell separation, and harmonic mode parameter. It is shown that a fiber with a minimum inner shell radius of at least $25\lambda$ (where $\lambda$ is the vacuum wavelength), and a minimum shell separation of at least $10\lambda$ provides a reasonable trade off between fiber size and grating performance. A simulation of the multimode fiber grating shows that a grating with a FWHM bandwidth on the order of $10^{-4}\lambda$ is theoretically possible if optical power is launched strictly into modes with angular harmonic parameter p=1.

38 Claims, 11 Drawing Sheets

MULTIMODE FIBER FOR NARROWBAND BRAGG GRATINGS

CROSS REFERENCE TO RELATED U.S. PATENT APPLICATION

This patent application relates to U.S. provisional patent application Serial No.: 60/290,995 filed on May 16, 2001, entitled NOVEL MULTIMODE FIBER FOR NARROWBAND BRAGG GRATINGS.

FIELD OF THE INVENTION

The present invention relates to an optical fiber structure with modal propagation characteristics tailored to facilitate the fabrication of narrowband multimode fiber Bragg gratings, and more particularly the present invention relates to multimode optical fibers having concentric shells of alternating high and low refractive indexes.

BACKGROUND OF THE INVENTION

Fiber grating structures in single mode fiber (SMF) have been studied extensively since the discovery of photosensitivity in germanium doped silica fiber. They have been used in numerous applications ranging from wavelength selective filtering in wavelength division multiple access (WDMA) systems, to temperature and strain sensing. To a lesser extent, Bragg gratings in multimode fibers have also received attention. Wanser et al. [1] calculated the theoretical spectrum of multimode fiber Bragg gratings (MMFG's) and suggested their use for mircobend sensing. Mizunami et al. [2] experimentally confirmed the spectral properties of MMFG's. A grating was fabricated in a graded index fiber that had a reflection spectrum of 15 nm width centered at 1560 nm, contained multiple peaks, and had a minimum transmission of 3.4% with selective mode launching. The reflection response was not measured. This same group later reported a detailed analysis of MMFG [3], including temperature and polarization characteristics. MMFG's are also useful for tuning solid-state lasers in which the high coupling efficiency of multimode fiber (MMF) is attractive [4].

While the wideband, low reflectivity gratings that are possible in standard multimode fiber are useful, a narrowband, high reflectivity response could have a dramatic impact on optical communication systems. MMF's have the advantage of easy coupling to inexpensive light sources such as light-emitting diodes (LED's). In particular, graded index MMF's have relatively low modal dispersion. These two factors in conjunction have led to the predominant use of graded index MMF in local area network applications. The possibility of a narrowband fiber Bragg grating in a MMF would enable the use of WDM in LAN's. Other applications that would benefit include the field of in vivo Raman spectroscopy in which MMF is used for light collection efficiency, but narrowband filtering is required for signal recovery.

Therefore it would be advantageous to provide a multimode fiber having propagation characteristics tailored to facilitate the fabrication of narrowband multimode fiber Bragg gratings.

SUMMARY OF THE INVENTION

The present invention provides a novel multimode fiber structure with modal propagation characteristics tailored to facilitate the production of narrow-band, high reflectivity, fiber Bragg gratings.

In one aspect the present invention provides a multimode optical fiber, comprising:

a cylindrical fiber core and a plurality of concentric shells, the cylindrical fiber core and said plurality of concentric shells comprised of alternating higher and lower refractive index materials with said cylindrical fiber core comprised of said lower refractive index material, said higher refractive index material having a refractive index $n_h$ and said lower refractive index material having a refractive index $n_L$, said higher refractive index shells having a thickness t, said higher and lower refractive indexes and said higher refractive index shell thickness t satisfying a relationship given by $t(n_h^2-n_L^2)^{1/2}<\lambda/2$, wherein $\lambda$ is a wavelength of light propagating in said optical fiber.

In this aspect of the invention the concentric shells having the lower refractive index $n_L$ may have a thickness $\Delta$, with $\Delta>5\lambda$. In this aspect the core may have a radius of about $25\lambda$, wherein $\lambda$ is the vacuum wavelength, and $\Delta$ may be at least $10\lambda$.

In this aspect of the invention each of said high refractive index shells may include a grating written therein, each grating comprising a selected refractive index modulation along a length of the fiber. These gratings may include apodized gratings, chirped gratings, chirped Moiré gratings and long period gratings.

In another aspect of the present invention there is provided a multimode optical fiber, comprising:

a cylindrical fiber core and a plurality of concentric shells, the cylindrical fiber core and said plurality of concentric shells comprised of alternating higher and lower refractive index materials with said cylindrical fiber core being comprised of the higher refractive index material, said higher refractive index material having a refractive index $n_h$ and said lower refractive index material having a refractive index $n_L$, said cylindrical fiber core having a radius R and the first concentric shell enveloping said cylindrical fiber core comprised of the low refractive index material having a wall thickness D, said higher and lower refractive indexes and said higher refractive index fiber core of radius R satisfying a relationship given by $R(n_h^2-n_L^2)^{1/2}<0.383\lambda$, wherein $\lambda$ is the minimum wavelength which propagates in said higher refractive index core and concentric shells.

In this aspect of the invention each of said high refractive index shells may include a grating written therein, each grating comprising a selected refractive index modulation along a length of the fiber. These gratings may include apodized gratings, chirped gratings, chirped Moiré gratings and long period gratings.

In another aspect of the present invention there is provided a multimode optical fiber, comprising:

a cylindrical fiber core and at least one concentric shell having a thickness t, the cylindrical fiber core and said at least one concentric shell comprised of alternating lower and higher refractive index materials with said cylindrical fiber core comprised of said lower refractive index material and said at least one concentric shell comprised of said higher refractive index material, said higher refractive index material having a refractive index $n_h$ and said lower refractive index material having a refractive index $n_L$, said higher and lower refractive indexes and said higher refractive index shell thickness t satisfying a relationship given by $t(n_h^2-n_L^2)^{1/2}<\lambda/2$, wherein $\lambda$ is a wavelength of light propagating in said optical fiber.

BRIEF DESCRIPTION OF THE DRAWINGS

Preferred embodiments of the invention will now be described, by way of example only, reference being made to the drawings, in which.

DETAILED DESCRIPTION OF THE INVENTION

Figure 1A:
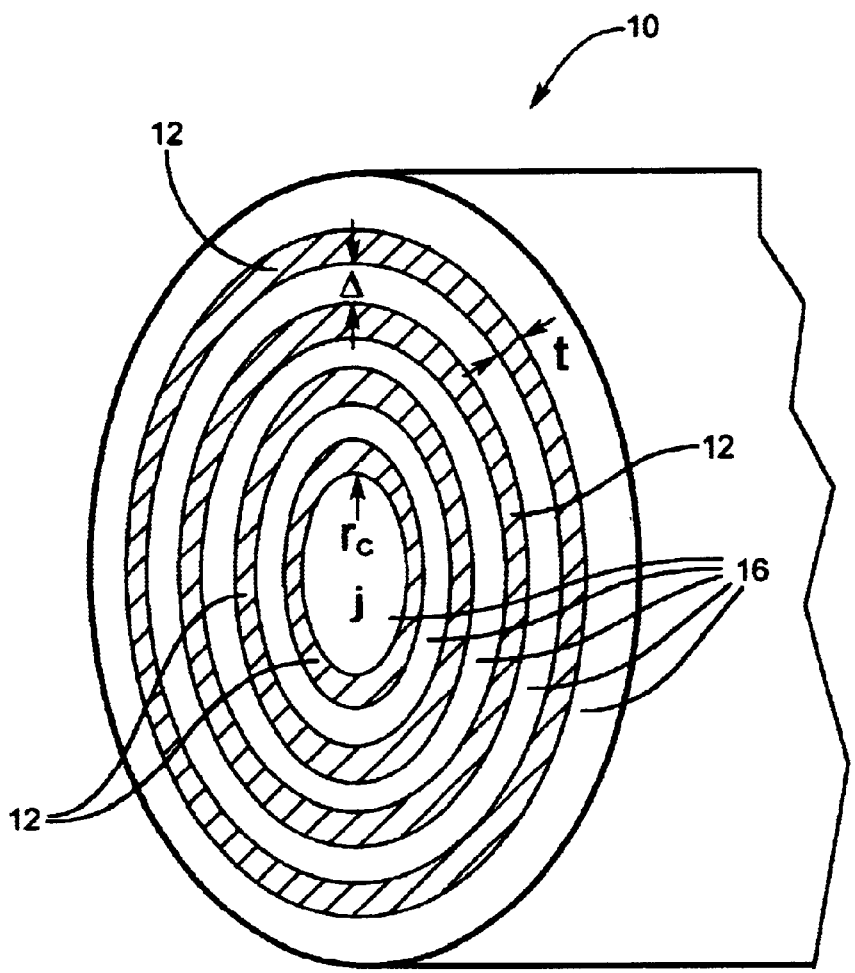
FIG. 1a shows a multimode fiber structure constructed in accordance with the present invention having concentric shells of higher refractive index (shaded region) are superimposed on uniform cladding regions of lower refractive index (unshaded region)

Section A below provides a theoretical framework behind the novel fiber structure disclosed herein having modal propagation characteristics tailored to facilitate the fabrication of narrow-band MMFG's. The method used for numerical simulations of the guided modes of the novel MMF is presented and discussed in Section B. Fiber simulation results are discussed in Section C. Simulations of the reflectivity of MMFG's using the proposed structure and a graded index (GRIN) MMF are presented in Section D, and some preliminary examples of experimental results with a prototype fiber are shown in Section E

A) Design Concept

We first derive the condition required on the longitudinal propagation constants of guided modes for narrowband MMFG's. The interaction of a forward propagating mode with a fiber grating results in significant reflection when the Bragg condition is satisfied, $$\beta_i = \frac{2\pi}{\Lambda} + \beta_r \tag{1}$$

where $\beta_i$ is the incident longitudinal wavevector, $\beta_r$ is the reflected longitudinal wavevector and $\Lambda$ is the period of the grating. If the incident mode couples to the same $m^{th}$ mode but in the counter propagating direction, we have $\beta_r=-\beta_i$. The resonant condition for mode m is, $$\lambda_i = 2n_m\Lambda \tag{2}$$

where $\lambda_i$ is the incident vacuum wavelength and $n_m$ is the effective index of the $m^{th}$ mode. Thus, each mode experiences resonance at a different vacuum wavelength. As a consequence, there is a limit on the bandwidth narrowness that can be achieved by an MMFG that is proportional to the maximum spread in effective index for the various modes supported in the fiber. For a typical refractive index difference of 0.01 between core and cladding, and grating index perturbation strength of $10^{-4}$, the spread in resonant wavelengths is greater than the width of each resonance by an approximate factor of 100. The spread in resonant wavelengths also results in the low peak reflectivity observed in MMFG's written in standard graded-index fiber [1]. This effect is most easily illustrated by considering a grating written in a fiber supporting N modes with nondegenerate effective indices. Since only one mode is in resonance at a particular wavelength, at most only approximately 1/N of the total optical power will interact resonantly with the grating for equal power launched into each mode. The total bandwidth of the grating can be decreased, and the peak reflectivity increased, by minimizing the difference between the maximum and minimum effective indices (or equivalently the longitudinal propagation constants) of the guided modes.

To develop an intuitive conception of an MMF that will minimize the difference in propagation constants, we introduce an analogy between the propagation of an electromagnetic mode within a fiber and a bound quantum mechanical particle in a potential well. Under the scalar approximation for the electromagnetic mode field, the fiber problem can be described by the same linear Schrödinger equation as for a bound particle, $$[\nabla_T^2 + k_0^2(n^2(r) - n_{\mathit{eff}}^2)]\Psi(r) = 0 \tag{3}$$

where $\nabla_T^2$ is the transverse Laplacian operator, r is the radial position, $k_0$ is the vacuum wavevector, n(r) is the radial index profile, $n_{\mathit{eff}}$ is the effective index, and $\Psi(r)$ is the scalar field.

The potential well and particle energy eigenvalues are analogous to the fiber index profile and effective indices respectively. A single potential well will give rise to discrete energy eigenvalues. If made suitably shallow, the potential well will possess only a single energy level for a single bound state. The analogous situation for an optical fiber is that of a single mode fiber. The situation of interest is that of a finite number of closely spaced potential wells. With N potential wells present, the energy levels of the single level split into N separate levels. The energy level splitting increases as the overlap between the independent single well states increases.

For optical fibers, the analogous result is that a periodic variation in the radial distribution of the index of refraction would give closely spaced values in the effective indices of guided modes. The close spacing of effective indices for different modes is exactly what is required for the design of narrow-band MMFG's.

Figure 1B:
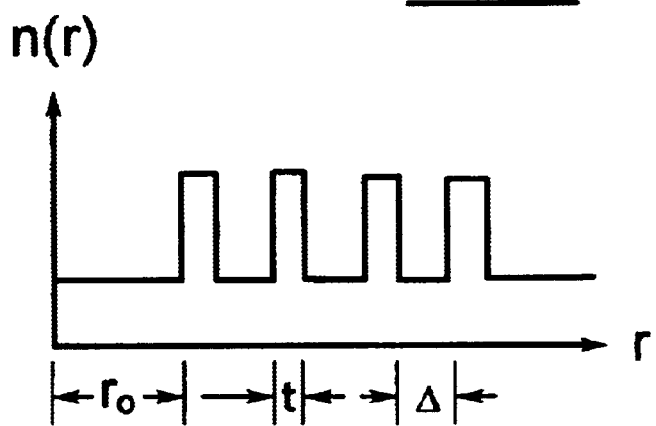
FIG. 1b shows the refractive index modulation across the radius of the MMF, the inner radius of the innermost shell is $r_0$, the shell separation is $\Delta$, and the high refractive index shell thicknesses are t.

The novel MMF disclosed herein is one analogous to a series of index wells, corresponding to an alternating series of cylindrical shells of higher and lower refractive index material. FIG. 1a shows a multimode fiber structure 10 constructed in accordance with the present invention having concentric shells 12 of higher refractive index (shaded region) enveloping uniform cladding regions 16 with cladding regions 16 being made of lower refractive index (unshaded regions) material. The inner radius of the innermost shell (cylindrical core) is $r_0$, the shell separation is $\Delta$, and the high refractive index shell thicknesses are t. FIG. 1b shows the refractive index modulation across the radius of the MMF.

There are some key differences where the analog between the proposed fiber and the one-dimensional potential wells breaks down. The guiding layers in the optical fiber possess cylindrical symmetry, and the effective indices of the guided modes thus depend upon the mean radius of the guiding layer. However, if the cylindrical shell possesses a thickness small compared to its mean radius, the shell approximates a planar structure. In this case, the condition for single mode (ignoring polarization for the moment) operation in each isolated cylindrical shell can be approximated using simple planar waveguide analysis. The restriction on the normalized parameter V, here defined for an individual shell, is $$V \equiv \frac{2\pi t \sqrt{n_{\mathit{shell}}^2 - n_{\mathit{cladding}}^2}}{\lambda} < \pi \tag{4}$$

for a TE mode [7], where $n_{\mathit{shell}}$ and $n_{\mathit{cladding}}$ are the shell and cladding refractive indices, t is the shell thickness and $\lambda$ is the vacuum wavelength. However, there still exist modes with angular wavevector components, and decreasing the index difference cannot eliminate these modes. Such modes do not have an analog in the one-dimensional potential well problem. Finally, the propagation of electromagnetic waves is described by a full vectorial wave equation. Hence, care must be taken to include the different degeneracies associated with polarization of the electromagnetic field. The counting of modes is discussed further in sections B and C below.

Although cylindrical periodic structures have been proposed for application to distributed feedback lasers [5], and guiding light in air through distributed reflection [6], the cylindrical shell structure disclosed herein is intended to function as a dielectric waveguide enabling narrowband longitudinal reflection and large mode area and therefore the structures disclosed in [5] and [6] satisfy a much different condition than equation (4) above. Furthermore, the structures disclosed in [5] and [6] are required to satisfy strict conditions on the low refractive index shell thickness quite different from the conditions on $\Delta$ in FIG. 1.

B) Finite Element Method

A full vector, second order finite element method was used to analyze the proposed MMF structure. An alternative method for the analysis of the cylindrically periodic structure is to use the known analytic form of the electromagnetic field within each homogenous region and match boundary conditions [8]. The computational requirements are still extensive, and the finite element method provides greater freedom in the analysis of various structures. The functional F chosen for the numerical calculations is the Lagrangian density integrated over the transverse plane $\Omega$ and expressed solely in terms of the magnetic field H [9]

$$F = \int\!\int_\Omega (\nabla \times H)^* \cdot (\varepsilon_r^{-1} \nabla \times H) d\Omega - k_0^2 \int\!\int_\Omega H^* \cdot H d\Omega + \tag{5}$$
$$\oint_\Gamma H^* \cdot [e_r \times (\varepsilon_r^{-1} \nabla \times H)] d\Gamma + s \int\!\int_\Omega (\nabla \cdot H)^* (\nabla \cdot H) d\Omega$$

where $\varepsilon_r$ is the relative electric permittivity, $\Gamma$ is the boundary of $\Omega$, $e_r$ is the unit radial vector, $k_0$ is the vacuum wavevector and s is the penalty parameter. The penalty method was used with $s = 1/n_{\mathit{cladding}}^2$ in order to eliminate spurious solutions with an effective index. The finite element method employing three magnetic field components is resilient against spurious solutions sensitive to discretization of the radial axis [9].

Considering Maxwell's equations for a guided mode within an axially symmetric structure, we assume a magnetic field of the form $$H = \left[ iH_r(r) \begin{Bmatrix} -\sin p\theta \\ \cos p\theta \end{Bmatrix} e_r + iH_\theta(r) \begin{Bmatrix} \cos p\theta \\ \sin p\theta \end{Bmatrix} e_\theta + H_z(r) \begin{Bmatrix} -\sin p\theta \\ \cos p\theta \end{Bmatrix} e_z \right] \tag{6}$$
$$\exp(i(\omega t - \beta z))$$

where $H_r(r)$, $H_\theta(r)$ and $H_z(r)$ are radial magnetic field distribution functions, $e_\theta$ is the unit polar angle vector, $e_z$ is the unit longitudinal vector, p is an integer not equal to 0, $\omega$ is the optical frequency and $\beta$ is the longitudinal propagation wave vector. In the special case of p=0, the harmonic function pairs in braces are replaced by a single constant. Thus, there is an inherent difference in degeneracy between modes with p=0 (TE and TM modes) and p≠0 (HE and EH modes). Each HE and EH mode exhibits a degeneracy of a factor of 2 associated with the two orthogonal sets of harmonic functions, while each TE and TM mode does not exhibit this degeneracy. Physically, it is the different symmetry of the TE/TM modes and the HE/EH modes that determines their degeneracy. A $\pi/2$ rotation about the axis of symmetry reproduces identically the axially symmetric TE and TM modes. Such a rotation produces HE and EH modes orthogonal to the original HE and EH modes.

Second order finite elements were constructed to approximate the functions $H_r(r)$, $H_\theta(r)$ and $H_z(r)$ for radii r within the area $\Omega$. Analytic expressions for the magnetic field into the infinite cladding were used in lieu of absorbing boundaries to calculate the closed loop integral term of the functional F. Solving Maxwell's equations for a homogenous cladding yields modified $p^{th}$ order Bessel functions of the second kind $K_p(\bullet)$ and the respective first derivative $K'_p(\bullet)$. The analytic expressions used are thus [8]:

$$H_r(r) = -A\frac{pa}{wr}K_p\left(\frac{wr}{a}\right) + B\frac{\beta a}{w}K'_p\left(\frac{wr}{a}\right) \quad (7)$$

$$H_\theta(r) = AK'_p\left(\frac{wr}{a}\right) - B\frac{p\beta a}{w^2 r}K_p\left(\frac{wr}{a}\right)$$

$$H_z(r) = BK_p\left(\frac{wr}{a}\right)$$

where $w = \sqrt{\beta^2 - k_0^2 n_{cladding}^2}\, a$, the radius at $\Gamma$ is a, and A, B are constants which can be related to the magnetic field of the element adjacent to $\Gamma$.

For all simulations, uniformly spaced nodes were used and the number of 15 elements was adjusted to that required for convergence to within a set desired tolerance. The analytic solutions depend on the parameter w, which was iteratively updated. The radius a was chosen sufficiently large that only one iteration was required. Typically, 150 elements were found to yield an effective index within $10^{-5}$ of the convergent result. Once the magnetic field has been calculated, the electric field and all other properties of interest of the guided mode can be determined.

C) Fiber Simulation Results

Figure 2:
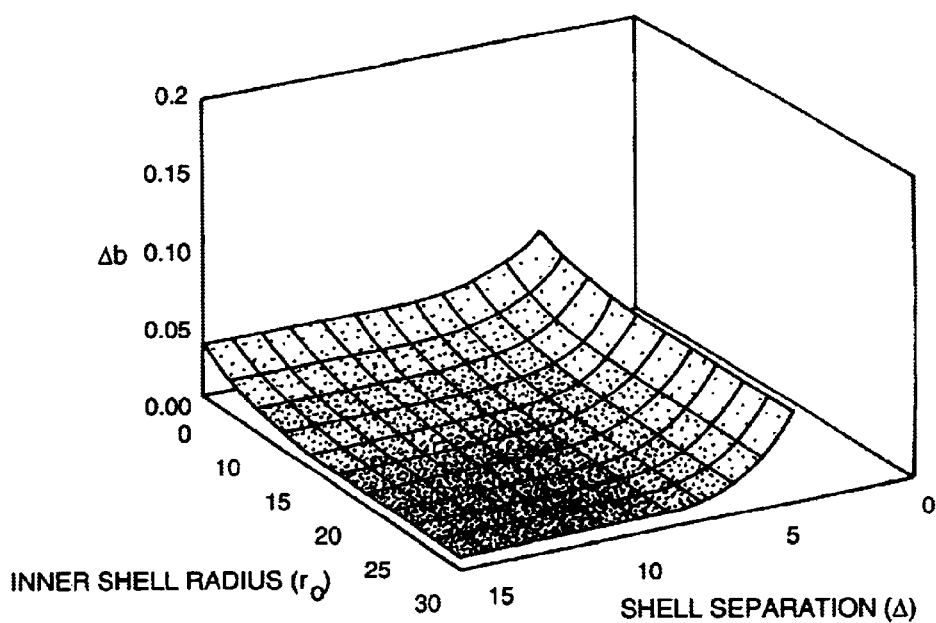
FIG. 2 shows numerical simulation results for the maximum spread in b parameter for modes with harmonic parameter p=1, the inner radius $r_0$ of the innermost shell and the shell separation $\Delta$ were varied independently for a concentric shell MMF with V=3.0807, the parameters $r_0$ and $\Delta$ are normalized to unit wavelength.

The first set of simulations was performed for an MMF structure with four cylindrical shells of fixed width but varying positions. The fiber V parameter used was 3.0807. The inner radius of the inner most shell $r_0$ was varied from $10\lambda$ to $30\lambda$, while the shell separation $\Delta$ was independently varied from $3\lambda$ to $15\lambda$. The modes with p=1 were selected, since these are the modes to which a linearly polarized, cylindrically symmetric wave would couple. The plot of FIG. 2 is the resulting maximum spread in the dimensionless parameter $b = (n_{eff}^2 - n_{cladding}^2)/(n_{shell}^2 - n_{cladding}^2)$, where $n_{eff}$ is the effective index of a particular mode. Two significant trends are apparent. The spread in b parameter ceases to significantly decrease as the shell separation is increased beyond $\Delta = 10\lambda$. Consequently, the shell separation need not be greater than $10\lambda$. Coupling between evanescent fields of adjacent shells increases the difference in b parameter among guided modes, as can be verified with a first order perturbation analysis. The second trend illustrated is the decrease in b parameter as the inner shell radius increases. As the inner shell radius increases, the variation in curvature between individual shells decreases. The shells become more similar in geometry and there is thus an expected increase in the degeneracy of the modal effective indices.

Closer observation of FIG. 2 allows one to place limits on values of inner shell radius $r_0$ for a given maximum allowable grating response broadening (for the selective launching of optical power into modes with harmonic parameter p=1). To first order in effective indices, we have approximately $\delta\lambda/\lambda = 2\Delta b(n_h - n_l)/(n_h + n_l)$, where k is the resonance wavelength, $\delta\lambda$ is the reflection response broadening due to the multimode nature of the fiber, $n_h$ is the high refractive index and $n_l$ is the low refractive index. For example, FIG. 2 gives us the knowledge that if we have typical $n_h - n_l =$ 0.080, $n_h + n_l = 3.0$ and a shell separation $\Delta \geq 10\lambda$, we require $r_0 > 15\lambda$ for $\delta\lambda/\lambda < 1.3\times10^{-3}$ and $r_0 > 25\lambda$ for $\delta\lambda/\lambda < 6.4\times10^{-4}$.

The dependence of b upon the p parameter for the proposed MMF structure was also investigated. Simulation results of an MMF structure with $r_0 = 25\lambda$, $\Delta = 10\lambda$ and V=3.0807 are presented in FIG. 3. A total of 240 modes (not including the multiplicity associated with $\pi/2$ rotations for HE and EH modes) were solved with p ranging from 0 to 43. For values of p below 4, the b parameters are concentrated about the value 0.64. As p increases for the simulated MMF, the b values 'split' into four pairs. The shell within which the electromagnetic field is localized characterizes each pair, although the localization is not complete even for p=5. Different polarizations further distinguish the members of each pair. This point is discussed further below. The inner most shell can support modes up to a certain maximum value of p. Each shell of subsequently greater mean radius can support modes with greater values of p. In the case of low p values, a consequence of degeneracy in the effective indices is mixing of the mode pair energy distribution among different shells.

The increase in maximum p value with localization radius may be understood by considering the full vector wave equation satisfied by the magnetic field, $$\nabla \times (\epsilon_r^{-1} \nabla \times H) - k_0^2 H = 0 \quad (8)$$

Terms proportional to $p/r$ and $p^2/r^2$ contribute to $\nabla \times (\epsilon_r^{-1} \nabla \times H)$. A limit is placed on the maximum p by the value of $k_0^2$. A shell of fixed mean radius R will thus be capable of supporting localized modes with a maximum cutoff value of p proportional to R to first order. An important conclusion is that the mean shell radius may be increased to increase the maximum p, albeit at the expense of proportionally increasing the diameter of the MMF structure.

The optical intensity, calculated as the time average Poynting vector projected onto the longitudinal axis, was calculated for the MMF structure considered above ($r_0 = 25\lambda$, $\Delta = 10\lambda$, V=3.0807). The optical intensity and electric field polarization are illustrated in FIGS. 4 to 7 for modes with p=1 and p=5, respectively. Degenerate modes associated with a $\pi/2$ rotation about the symmetry axis are not illustrated. The distributions of optical power for the modes with p=1 clearly exhibit mixing of the localized modes of independent shells. Careful examination of the optical intensity and electric field polarization direction reveals a modulation with $\pi$ periodicity in the polar angle $\theta$. Two types of electric field polarization are evident. The modes almost linearly polarized are reminiscent of the $HE_{11}$ mode in a step index fiber, see T. Okoshi, *Optical Fibers*, Academic Press, 1982. The modes exhibiting a rotation in polarization proportional to $\theta$ are reminiscent of the $EH_{11}$ mode of a step index fiber. In contrast, the p=5 modes are seen to be almost completely localized to individual shells. Indeed, with increasing p there is a higher degree of localization. The decrease in b parameter with decreasing localization radius for constant p is visible. Again, the modes can be grouped according to polarization, with similarity to $HE_{51}$ modes and $EH_{51}$ modes. A small modulation in intensity with $\pi/10$ periodicity in $\theta$ is present, although not visible in FIGS. 6 and 7.

D) Fiber Grating Simulations

Various Bragg grating structures can be fabricated in the multi-mode fibers disclosed herein. The simplest structure of course being a uniform Bragg grating, comprised of refractive index modulations in the high refractive index shells of the fiber. The period, duty cycle and amplitude of the grating remain constant along the full length of the grating.

Apodized gratings, meaning gratings with index modulation amplitude smoothly reduced to zero towards the edges of the grating structure, may be fabricated within the disclosed fiber. Serving the same function as in single mode fiber Bragg gratings, apodization will reduce the peak reflectivity of side bands. Chirped gratings may also be used in which the index modulation pitch, duty cycle, amplitude, or any combination thereof can be varied linearly or nonlinearly along the length of the grating. The purpose of chirping in such a case may be to broaden the stop band of the grating, or to obtain a desired dispersion from the grating. Overlap of chirped gratings, to form chirped Moiré gratings, can be used to obtain series of very narrow stop bands as in single mode fiber. Long period gratings may also be fabricated in the fiber to obtain broadband attenuation. In summary, any fiber grating structure or combination of structures known to those skilled in the art may be fabricated in multimode fibers.

The inventors have applied coupled mode theory [7] to study the behavior of MMFG's. The coupling strength between the modes α and β is given by $$\kappa_{\alpha,\beta} = \frac{-i\omega\varepsilon_0}{4} \int_\Omega \Delta n^2(r) E_\alpha^* \cdot E_\beta d\Omega \tag{9}$$

where ω is the optical frequency, $\Delta n^2(r)$ is the grating index perturbation squared and $E_\sigma$ is the electric field distribution of the mode σ normalized to unit power.

A uniform grating is considered here, with a grating index perturbation that is cylindrically symmetric and nonzero only in regions of high refractive index. Cylindrical symmetry eliminates coupling between modes with different harmonic parameters p because the harmonic functions of different order p are orthogonal. The coupling between modes of the same p complicates the reflection response of an MMFG considerably. However, for the cylindrical shell MMF proposed here, the cross-coupling between modes of the same p is weak, particularly for modes localized to different shells. Calculation of the coupling constants for the proposed MMF structure with V=3.0807, r=25λ and Δ=10λ (as used to generate intensity plots of FIGS. 4–7) yielded a maximum ratio of cross-coupling strength to self-coupling strength of 1.7%. Similar results follow for standard step index and graded index fibers since the guided modes are almost orthogonal within the photosensitive core. Neglecting cross-coupling amounts to approximating the total grating reflection response as the weighted sum of the individual reflection responses for each mode considered in isolation. Assuming only self-coupling, the grating reflection response may be written as [1]

$$R(L, \lambda) = \sum_\sigma \eta_\sigma \frac{|\kappa_{\sigma,\sigma}|^2 \sinh^2(S_\sigma L)}{\Delta\beta_\sigma^2 \sinh^2(S_\sigma L) + S_\sigma^2 \cosh^2(S_\sigma L)} \tag{10}$$

where $$\eta_\sigma = P_\sigma \bigg/ \sum_\mu P_\mu$$

is the fraction of total optical power in mode σ, $\Delta\beta_\sigma = 2\pi(n_\sigma/\lambda - \frac{1}{2}\Lambda)$ is the wavevector detuning and $S_\sigma = \sqrt{|\kappa_{\sigma,\sigma}|^2 - \Delta\beta_\sigma^2}$ is the detuned coupling strength.

Figure 8A:
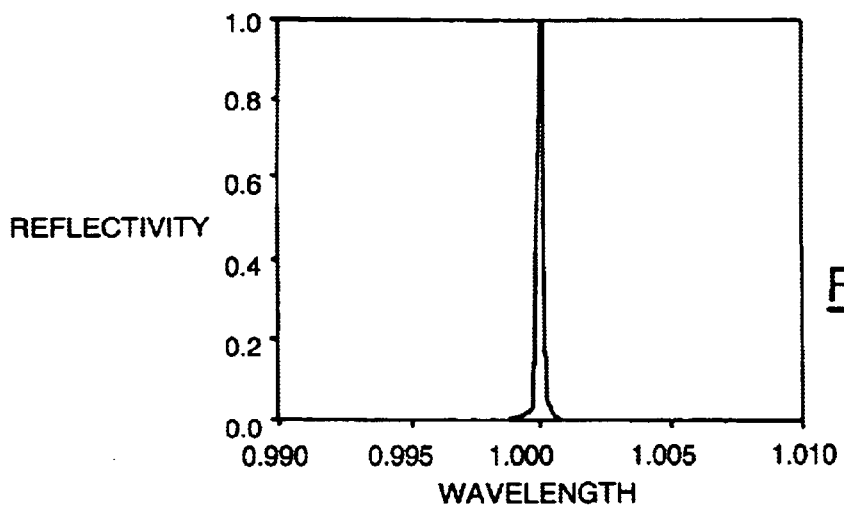
FIG. 8 shows the calculated reflection response of a $2\times10^4$ period grating with $\Delta n=1.7\times10^{-4}$ in: 8a) the proposed MMF with optical power distributed equally between $HE_{11}$ and $EH_{11}$ like modes; 8b) the proposed MMF with optical power distributed equally between all modes; and 8c) a graded index MMF comparable to the proposed MMF with optical power distributed equally among all modes, the wavelength scale is normalized to unity.
Figure 8B:
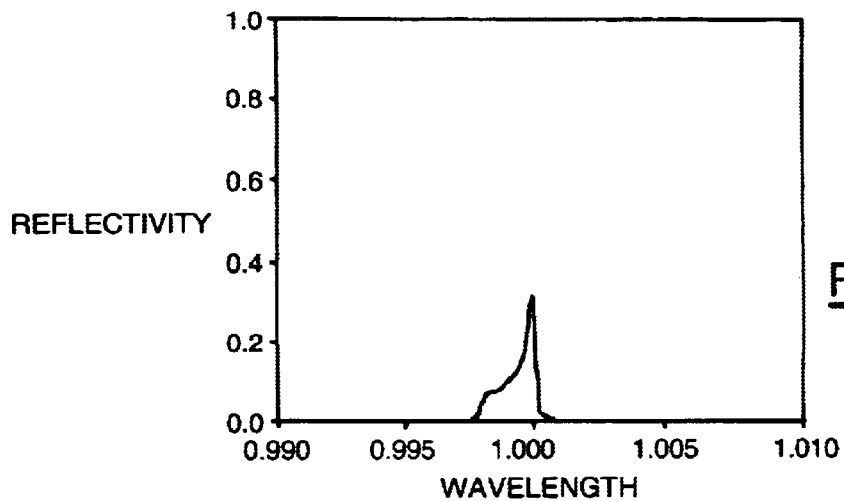
Figure 8C:
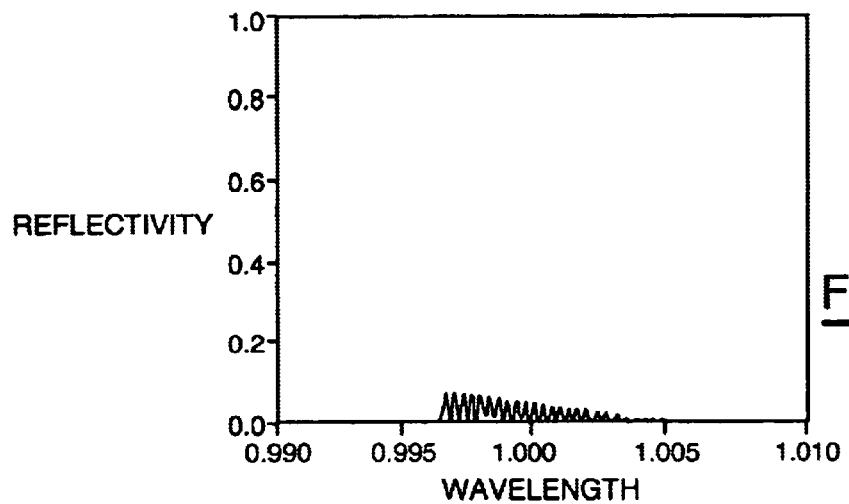

To illustrate the theoretical feasibility of a narrow band grating, a uniform $2\times10^4$ period grating with a peak index depth of $\Delta n = 1.7\times10^{-4}$ was simulated in the proposed MMF structure and a graded index fiber. For comparison purposes, the graded index fiber was assumed to have the same peak core and cladding indices and a core radius of 25λ, giving V=19.06 according to conventional definition of normalized frequency V. Three reflection response characteristics were calculated and are illustrated in FIGS. 8(a), 8(b) and 8(c). The first plot, FIG. 8(a) is the reflection response of the proposed MMF assuming optical power distributed evenly among all eight p=1 modes. The peak reflectivity is 100% and the FWHM bandwidth is $2.5\times10^{-4}\lambda$. FIG. 8(b) illustrates the reflection response of the grating if optical power is distributed equally among all modes of the proposed MMF. A peak reflectivity of 31.5% (−5.0 dB) and a FWHM bandwidth of $\sim6\times10^{-4}\lambda$ characterize the reflection response. An asymmetric pedestal is present in the reflection response, resulting from higher p modes resonating with the grating. The graded index fiber was considered last in FIG. 8(c), with optical power distributed equally among all the modes of the fiber. The peak reflectivity is 7.9% (−11.0 dB) and the FWHM bandwidth is $\sim5\times10^{-3}\lambda$. A notable feature of the reflection response is the large ripple associated with individual resonances. Each resonance is in fact due to the principal modes of the graded index fiber [3]. The modes of the graded index fiber exhibit some degeneracy, and thus a simplified representation of the total set of guided modes is the set of principal modes with associated multiplicity. As an example, the modes $HE_{12}$, $EH_{11}$, and $HE_{31}$ form a single principal mode in graded index fibers. In FIG. 8(c), we see 24 principal modes, with higher multiplicity towards the short wavelength side. These simulations have recently been published in the scientific literature [11].

Figure 3:
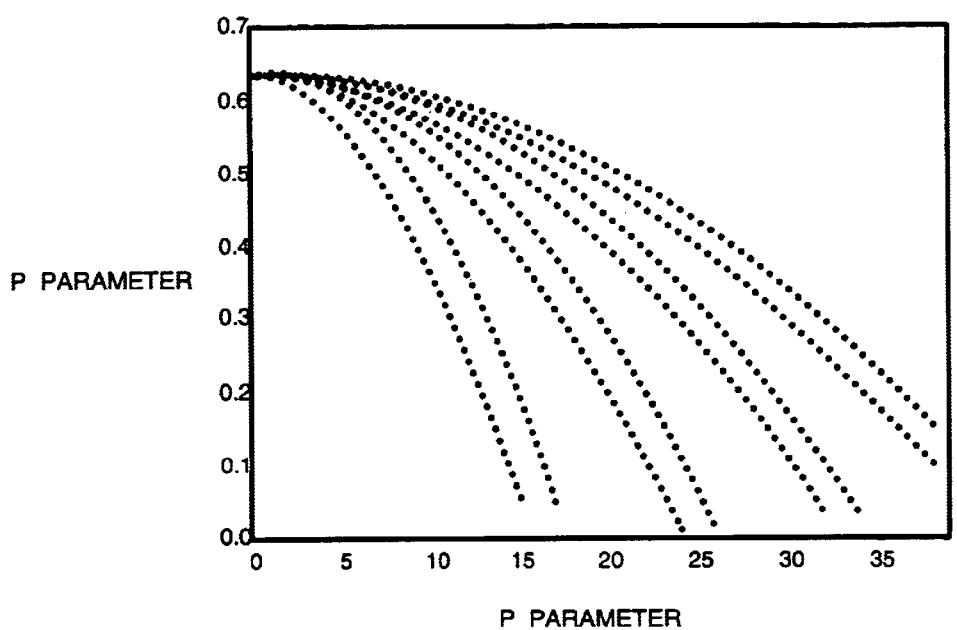
FIG. 3 shows numerical simulation results for b parameter versus p parameter wherein the concentric shell MMF was simulated with $r_0=25\lambda$, $\Delta=10\lambda$ and V=3.0807.
Figure 4:
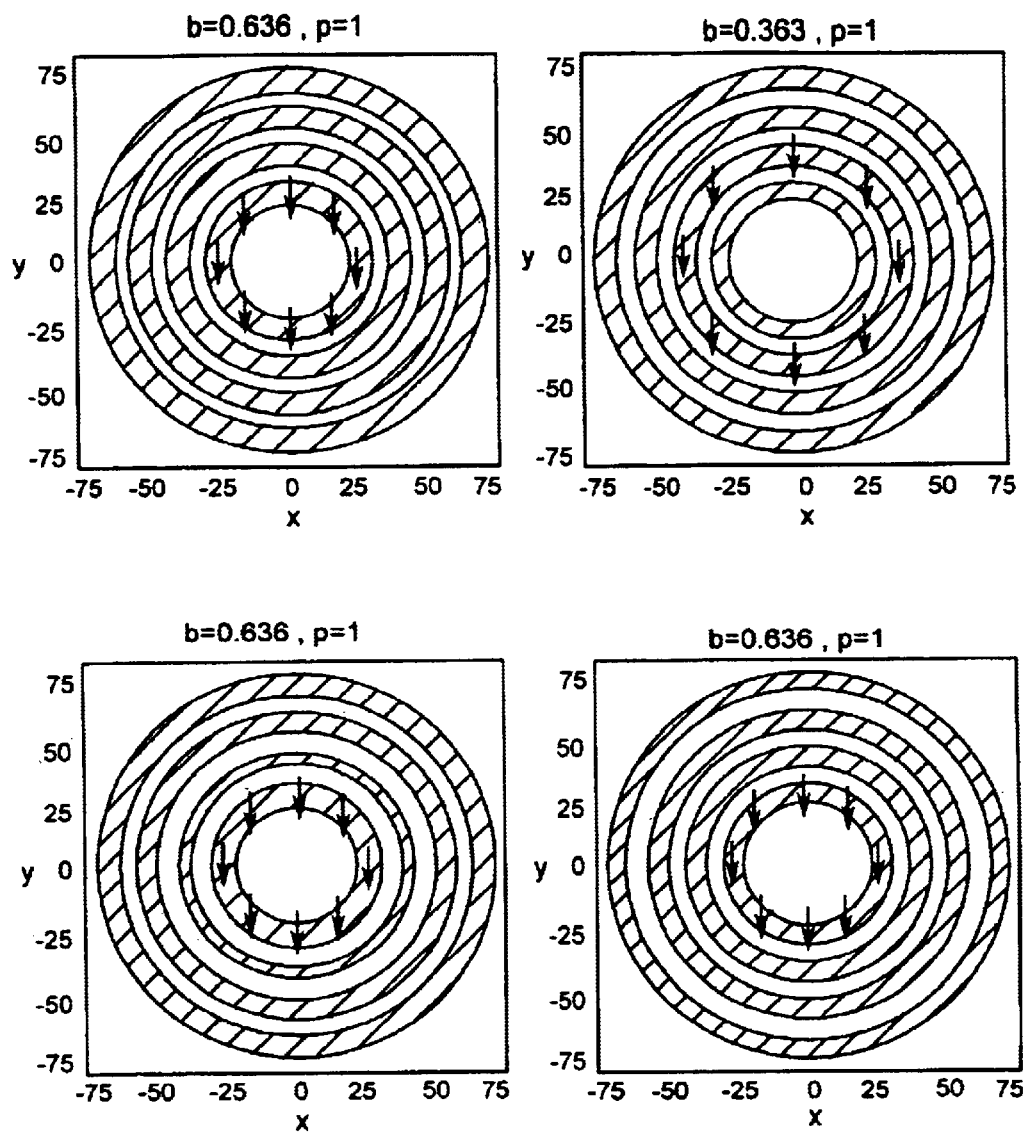
FIG. 4 are contour plots of the optical intensity for modes resembling $HE_{11}$. Increasing levels of darkness indicate greater optical intensity, the direction of electric field polarization is illustrated for the shell with greatest optical intensity and the coordinates x and y are normalized to unit wavelength.
Figure 5:
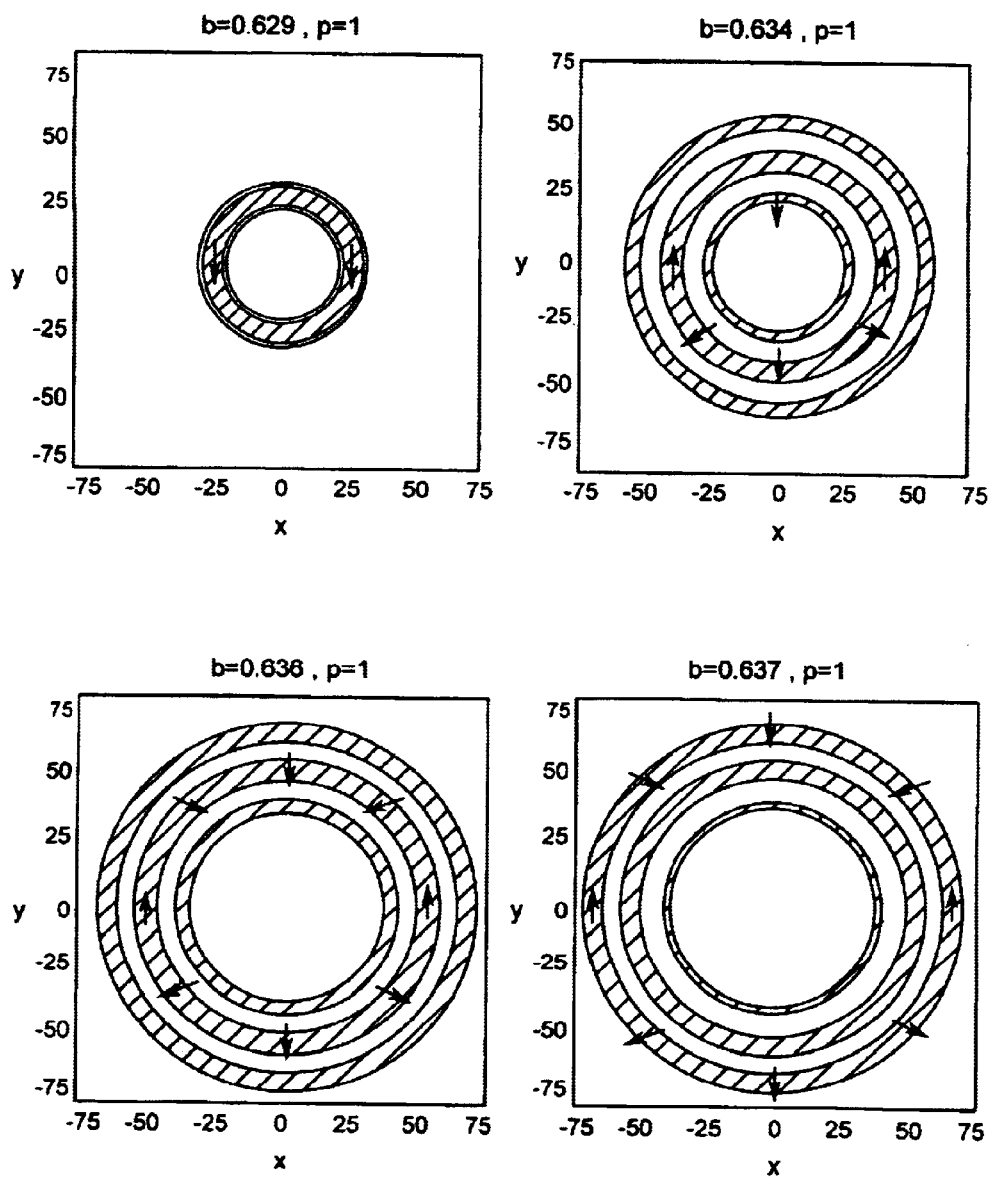
FIG. 5 are contour plots of the optical intensity for modes resembling $EH_{11}$, increasing levels of darkness indicate greater optical intensity and the direction of electric field polarization is illustrated for the shell with greatest optical intensity and the coordinates x and y are normalized to unit wavelength.
Figure 6:
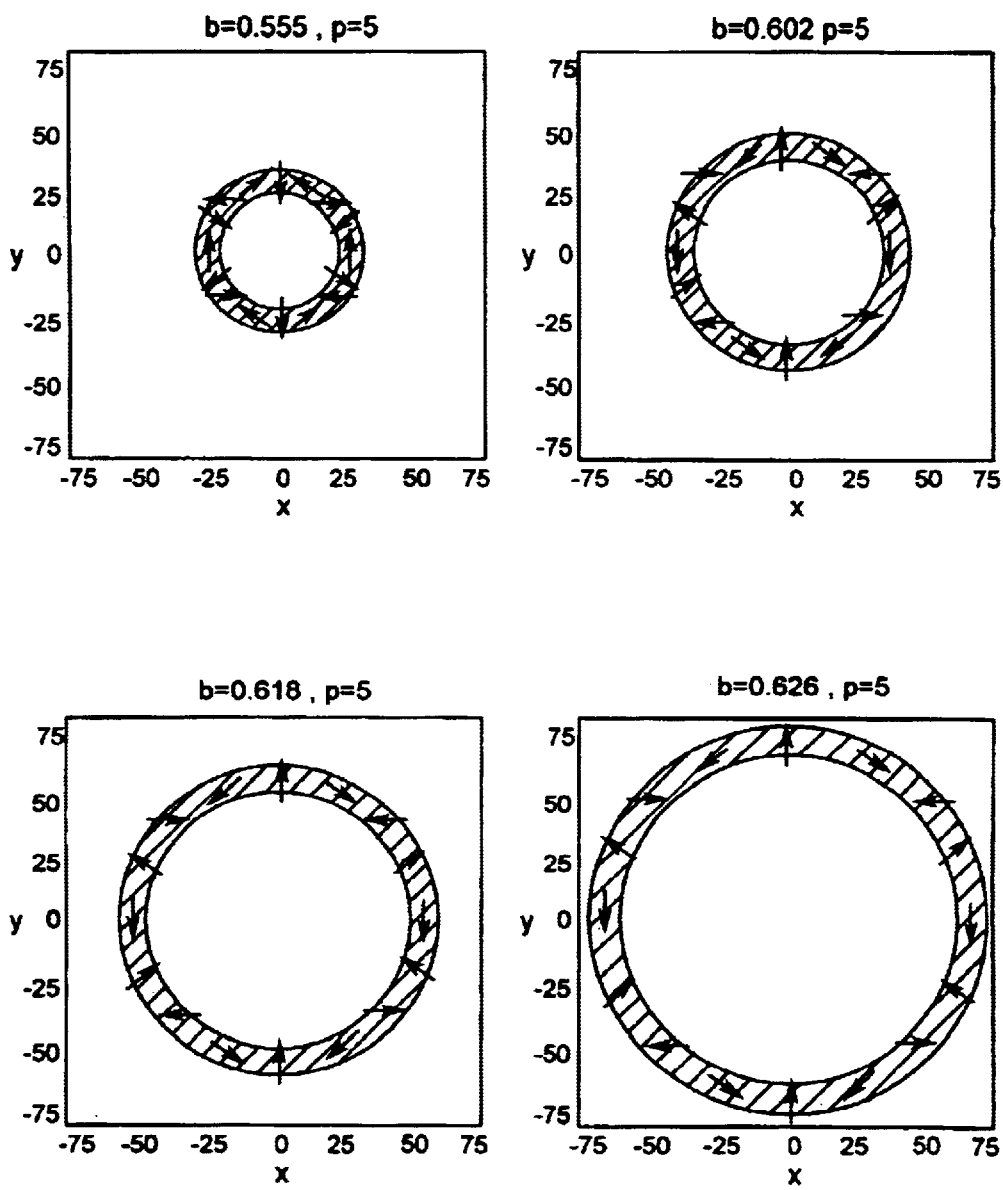
FIG. 6 are contour plots of the optical intensity for modes resembling $HE_{51}$, increasing levels of darkness indicate greater optical intensity, the direction of electric field polarization is illustrated for the shell with greatest optical intensity and the coordinates x and y are normalized to unit wavelength.
Figure 7:
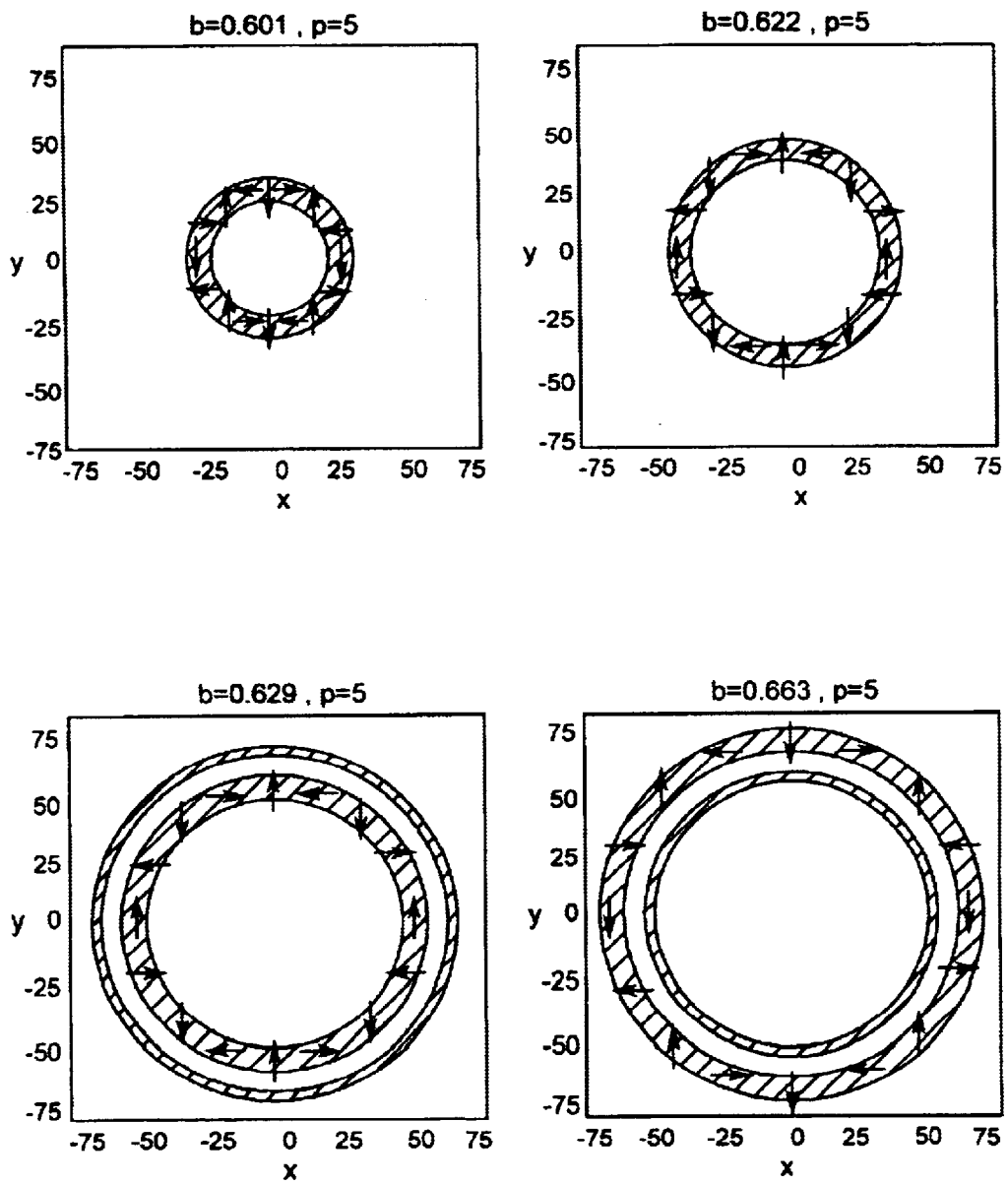
FIG. 7 are contour plots of the optical intensity for modes resembling $EH_{51}$. Increasing levels of darkness indicate greater optical intensity, the direction of electric field polarization is illustrated for the shell with greatest optical intensity and the coordinates x and y are normalized to unit wavelength.

The low reflectivity of a grating in graded index MMF is caused by the reduction of the fraction of optical power that resonates with the grating at a particular wavelength due to the spread of effective index amongst the guided modes. The reflectivity of the grating provides a combined measure of the distribution of the effective indices of the guided modes in the MMF and the distribution of power within those modes, as is evident upon examination of Eq. 10. A notable feature of the proposed MMF shell structure is that as power is launched into modes of subsequently lower harmonic parameter p, the grating reflectivity will increase and the bandwidth will decrease. This is evident from the dependence of b, and thus $n_{eff}$, upon p as illustrated in FIG. 3. A conventional multimode fiber consisting of a large central core will not improve as significantly in grating performance if optical power is concentrated in lower order modes. It is for lower p values that the most guided modes and also modes near cutoff will be present, resulting in a spread of effective index almost equal to that between the core and cladding. Equivalently, p=1 modes are distributed among different principal modes, and thus selectively launching into p=1 modes is not as effective in decreasing grating bandwidth and increasing peak reflectivity as in the proposed concentric shell MMF.

While having more than one high index shell separated by low index shells is preferred, it will be appreciated that one high index cylindrical shell enveloping a low index central core would also work. In this particular embodiment, the condition:

$t(n_h^2 - n_L^2)^{1/2} < \lambda/2$, must still be satisfied.

Figure 9A:
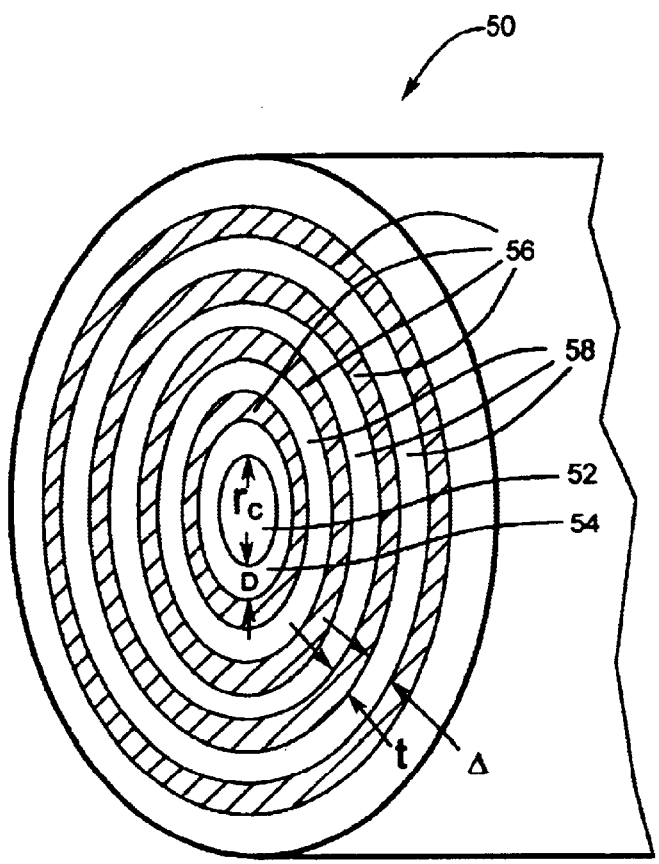
FIG. 9a shows an alternative embodiment of a multimode fiber structure constructed in accordance with the present invention having concentric shells of higher refractive index (shaded region) enveloping uniform cladding regions of lower refractive index (unshaded region)
Figure 9B:
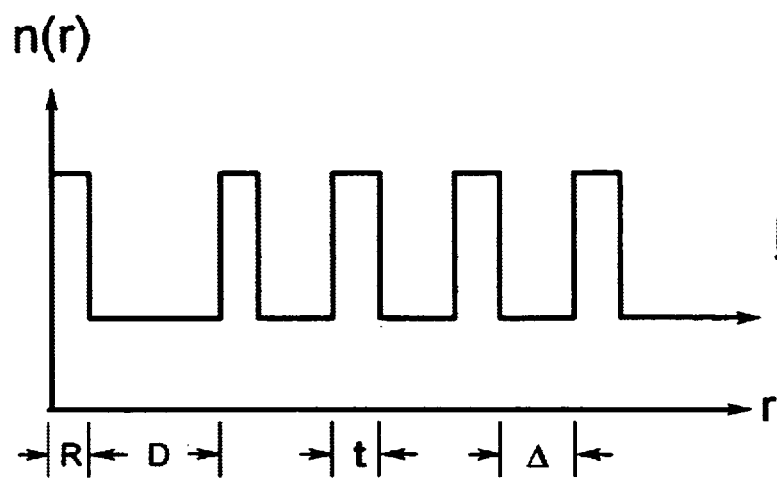
FIG. 9b shows the refractive index modulation across the radius of the MMF, the inner radius of the innermost shell is $r_0$, the shell separation is $\Delta$, and the high refractive index shell thickness is t.
Figure 10A:
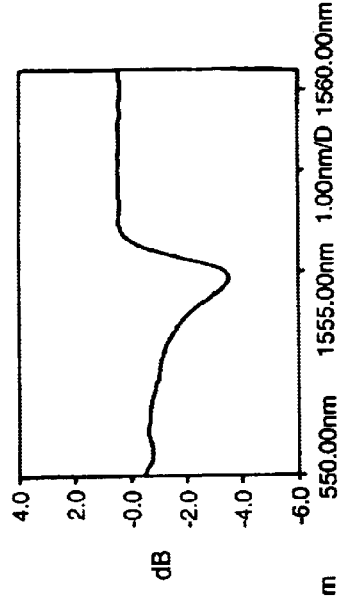
FIG. 10 shows examples of the results of the transmission spectra of a 4-ring optical fiber constructed according the present invention with a design similar to that shown in FIG. 1, a 2.5-cm long Bragg grating is written in the fibre using the standard phase mask technique using an eximer laser with an exposure time of (a) 1 min; (b) 5 min; (c) 9 min; (d) 12 minutes.
Figure 10B:
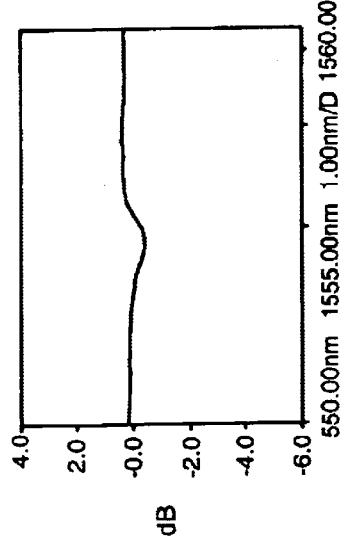
Figure 10C:
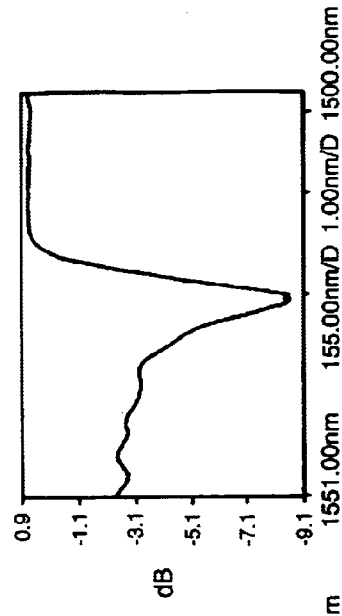
Figure 10D:
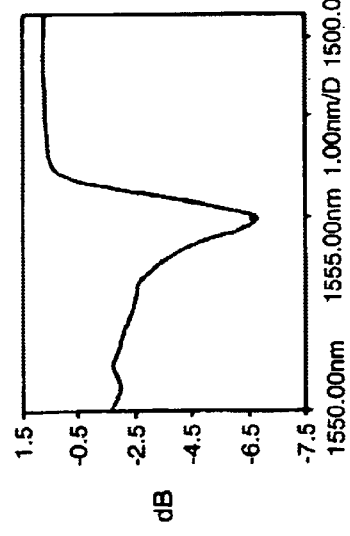

Referring to FIG. 9a, an alternative embodiment of a multimode fiber constructed in accordance with the present invention is shown generally at 50. In fiber 50 a light guiding fiber core 52 of refractive index $n_h$ and radius R is enveloped within a surrounding shell 54 of lower refractive index $n_L$ having a thickness D. Subsequent high index shells 56 have a thickness t separated by low index shells 58 of thickness Δ, see FIG. 9b which shows a plot of refractive index versus radius of the fiber. In this embodiment the equation to be satisfied is: $R(n_h^2-n_L^2)^{1/2}<0.383\lambda$, where λ is the minimum wavelength at which the fiber will operate in the desired manner. The equation above places a restriction on the indices of refraction and core radius. There is also a restriction on the thickness (D) of the low index shell separating the above mentioned core and the first high index shell. The limit is: D>20λ where λ is the maximum wavelength at which the fiber will operate in the desired manner.

EXAMPLE

Studies on grating formation and grating characteristics using a 4-ring fiber structure as described in FIG. 1 are disclosed herein. The fiber had a diameter of 128 μm. Bragg gratings were fabricated in this fiber using standard grating writing techniques involving exposure to eximer laser radiation through a phase mask designed for writing gratings at a wavelength of 1.556 μm. The fibers were sensitized using standard, commonly-used $H_2$-loading techniques, and then gratings were written with varying exposure times. FIG. 10 shows transmission spectra for these fibers showing how the grating strength and characteristics depend on the exposure time.

Figure 11A:
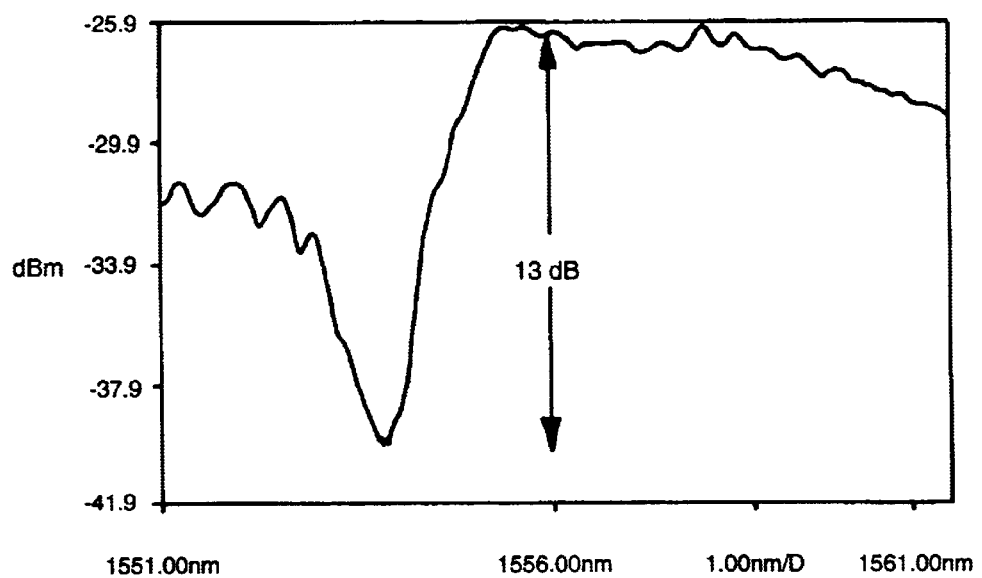
FIG. 11 shows examples of additional transmission spectra of Bragg gratings written in the fibre of FIG. 10 showing (a) a loss of greater than 13 dB at the Bragg wavelength; and (b) a high-resolution trace showing a fractional bandwidth of $<4\times10^{-4}$.
Figure 11B:
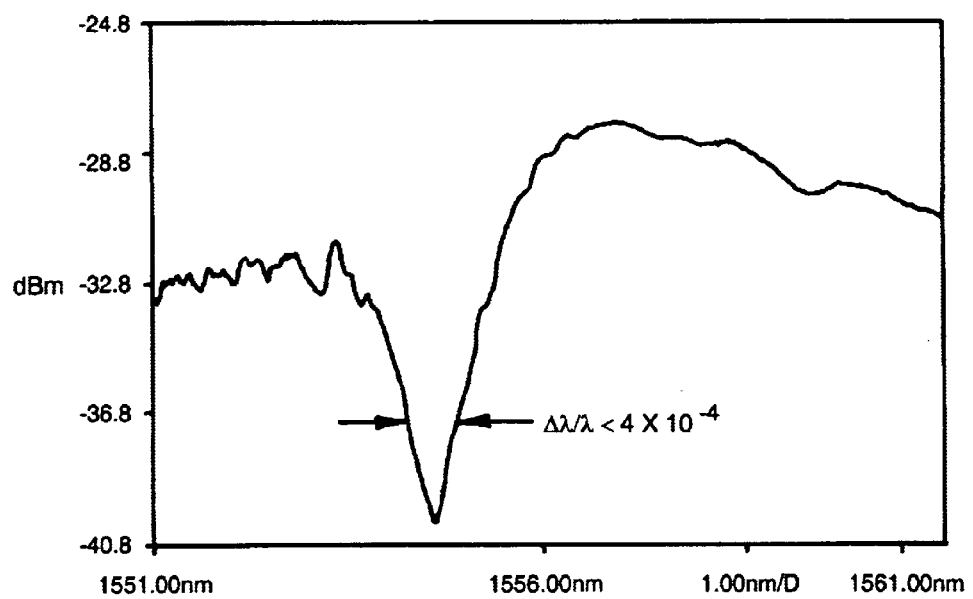

FIG. 11 shows the best results obtained to date. In FIG. 11(a), a grating is shown with a transmission loss of <13 dB at the Bragg wavelength. This loss is sufficient to obtain useful operation as a filter in a biomedical Raman probe. FIG. 11(b) shows a high-resolution spectrum with a fractional wavelength resolution of $<4\times10^{-4}$. This is very close to the ultimate resolution expected with excitation of only circularly-symmetric modes (see FIG. 8 and Section D) even though no special techniques were used to control the white light coupled into the fiber.

SUMMARY

A novel multimode fiber structure comprised of alternating high and low refractive index shells has been disclosed herein. The new fiber structure enables narrowband, high reflectivity Bragg gratings to be written into the multimode fiber. It has been shown that modal effective index degeneracy is required for narrowband grating operation. Simulations employing a finite element method were performed to characterize the variation in effective index as a function of the proposed MMF structure parameters. Simulations of a uniform $2\times10^4$ period grating of strength $\Delta n=5\times10^{-4}$ in the proposed MMF and a graded index fiber were compared. If power is launched solely into p=1 modes, a reflectivity of 100% was shown to be attainable in the proposed MMF. Peak reflectivities of 7.9% and 31.5% were shown to be achievable in a graded index MMF and the proposed MMF respectively if optical power was launched equally into all modes.

The concentric shell fiber structure disclosed herein may be used in applications where a large coupling area for light collection and narrowband filtering function are required simultaneously. Two such applications are LAN's employing multimode fiber and collection fibers with intra-fiber filtering for in vivo Raman spectroscopy. An apparatus for Raman spectroscopy would include a light source for producing a light of preselected wavelengths and the present multimode optical fiber having opposed ends and being connected at one end thereof to the light source. A detection means is optically coupled to the multimode optical fiber for detecting light scattered by Raman spectroscopy incident on the other end of the multimode optical fiber. For example, the free end of the fiber can be inserted into tissue and preferably there would be several high refractive index sheaths to provide good detection efficiency of the fiber. Raman scattered light is picked up and the gratings written into the high index shells filter out the excitation wavelengths so that substantially only the Raman scattered light from the tissue is detected.

As used herein, the terms "comprises" and "comprising" are to be construed as being inclusive and open ended, and not exclusive. Specifically, when used in this specification including claims, the terms "comprises" and "comprising" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

References

[1] K. H. Wanser, K. F. Voss, and A. D. Kersey, "Novel fiber devices and sensors based on multimode fiber Bragg gratings," *Proc. SPIE*, vol. 2360, pp. 265–268, 1994.

[2] T. Mizunami, S. Gupta, T. Yamao, and T. Shimomura, "Multimode fiber Bragg gratings—spectral characteristics and applications," *Int Conf. Integrated Optics Optical Fiber Commun./Eur. Conf. Optical Commun.*, vol.3, pp.182–185, September 1997.

[3] T. Mizunami, T. V. Djambova, T. Niiho, and S. Gupta, "Bragg gratings in multimode and few-mode optical fibers", *J. of Lightwave Technol.*, vol.18, pp. 230–234, February 2000.

[4] N. J. Vasa, P. Husayin, M. Kidosaki, T. Okada, M. Maeda, and T. Mizunami, "Fiber grating butt-coupled cw Cr3+: LiSrAlF6 laser performance," in *Tech. Dig. Conf. Lasers and Electro-Optics*, San Francisco, Calif., pp. 67–68, May 1998.

[5] M. Toda, "Single-Mode Behaviour of a Circular Grating for Potential Disk-Shaped DFB Lasers", *IEEE J. of Quantum Electron.*, vol. 26, no. 3, pp. 473–481, March 1990.

[6] Y. Fink, D. J. Ripin, S. Fan, C. Chen, J. D. Joannopoulos, and E. L. Thomas, "Guiding Optical Light in Air Using an All-Dielectric Structure", *J. of Lightwave Technol.*, vol.17, no.11, pp. 2039–2041, November 1999.

[7] A. Yariv, *Optical Electronics*, 4th edition, Saunders College Publishing, 1991.

[8] W. C. Chew, *Waves and Fields in Inhomogeneous Media*, Van Nostrand Reinhold, 1990.

[9] Masanori Koshiba, *Optical Waveguide Analysis*, McGraw-Hill Inc., 1992.

[10] T. Okoshi, *Optical Fibers*, Academic Press, 1982.

[11] T. Szkopek, V. Pasupathy, J. E. Sipe and P. W. E. Smith, "Novel Multimode Fiber for Narrowband Bragg Gratings", *IEEE Special Topics in Quantum Electronics* (special issue on specialty optical fibers), vol. 7, pp. 425–433 2001.

Therefore what is claimed is:

1. A multimode optical fiber, comprising:
    a cylindrical fiber core and a plurality of concentric shells, the cylindrical fiber core and said plurality of concentric shells comprised of alternating higher and lower refractive index materials with said cylindrical fiber core comprised of said lower refractive index material, said higher refractive index material having a refractive index $n_h$ and said lower refractive index material having a refractive index $n_L$, said higher refractive index shells having a thickness t, said higher and lower refractive indexes and said higher refractive index shell thickness t satisfying a relationship given by $t(n_h^2-n_L^2)^{1/2}<\lambda/2$, wherein $\lambda$ is a wavelength of light propagating in said optical fiber.

2. The multimode optical fiber according to claim 1 wherein said concentric shells having the lower refractive index $n_L$ have a thickness $\Delta$, and wherein $\Delta>5\lambda$.

3. The multimode optical fiber according to claim 2 wherein said core has a radius of at least about $15\lambda$.

4. The multimode optical fiber according to claim 3 wherein said fiber core has a radius of about $25\lambda$, wherein $\lambda$ is the vacuum wavelength, and $\Delta$ is at least $10\lambda$.

5. The multimode optical fiber according to claim 1 wherein each of said high refractive index shells includes a grating written therein, said grating including a selected refractive index modulation along a length of said fiber.

6. The multimode optical fiber according to claim 2 wherein each of said high refractive index shells includes a grating written therein, said grating including a selected refractive index modulation along a length of said fiber.

7. The multimode optical fiber according to claim 3 wherein each of said high refractive index shells includes a grating written therein, said grating including a selected refractive index modulation along a length of said fiber.

8. The multimode optical fiber according to claim 4 wherein each of said high refractive index shells includes a grating written therein, said grating including a selected refractive index modulation along a length of said fiber.

9. The multimode optical fiber according to claim 5 said grating is selected from the group consisting of apodized gratings, chirped gratings, chirped Moiré gratings and long period gratings.

10. The multimode optical fiber according to claim 5 said grating is selected from the group consisting of apodized gratings, chirped gratings, chirped Moiré gratings and long period gratings.

11. The multimode optical fiber according to claim 6 said grating is selected from the group consisting of apodized gratings, chirped gratings, chirped Moiré gratings and long period gratings.

12. The multimode optical fiber according to claim 7 said grating is selected from the group consisting of apodized gratings, chirped gratings, chirped Moiré gratings and long period gratings.

13. A multimode optical fiber, comprising:
a cylindrical fiber core and a plurality of concentric shells, the cylindrical fiber core and said plurality of concentric shells comprised of alternating higher and lower refractive index materials with said cylindrical fiber core being comprised of the higher refractive index material, said higher refractive index material having a refractive index $n_h$ and said lower refractive index material having a refractive index $n_L$, said cylindrical fiber core having a radius R and the first concentric shell enveloping said cylindrical fiber core comprised of the low refractive index material having a wall thickness D, said higher and lower refractive indexes and said higher refractive index fiber core of radius R satisfying a relationship given by $R(n_h^2-n_L^2)^{1/2}<0.383\lambda$, wherein $\lambda$ is the minimum wavelength which propagates in said higher refractive index core and concentric shells.

14. The multimode optical fiber according to claim 13 wherein $D>20\lambda$ where $\lambda$ is a maximum wavelength which propagates in said higher refractive index core and concentric shells.

15. The multimode optical fiber according to claim 13 wherein said high refractive index concentric shells have a thickness t, and wherein $t(n_h^2-n_L^2)^{1/2}<\lambda/2$, wherein $\lambda$ is the minimum wavelength of light propagating in said optical fiber.

16. The multimode optical fiber according to claims 13 wherein each of said high refractive index shells includes a grating written therein, said grating including a selected refractive index modulation along a length of said fiber.

17. The multimode optical fiber according to claims 14 wherein each of said high refractive index shells includes a grating written therein, said grating including a selected refractive index modulation along a length of said fiber.

18. The multimode optical fiber according to claims 15 wherein each of said high refractive index shells includes a grating written therein, said grating including a selected refractive index modulation along a length of said fiber.

19. The multimode optical fiber according to claim 16 said grating is selected from the group consisting of apodized gratings, chirped gratings, chirped Moiré gratings and long period gratings.

20. The multimode optical fiber according to claim 17 said grating is selected from the group consisting of apodized gratings, chirped gratings, chirped Moiré gratings and long period gratings.

21. The multimode optical fiber according to claim 18 said grating is selected from the group consisting of apodized gratings, chirped gratings, chirped Moiré gratings and long period gratings.

22. A multimode optical fiber, comprising:
a cylindrical fiber core and at least one concentric shell having a thickness t, the cylindrical fiber core and said at least one concentric shell comprised of alternating lower and higher refractive index materials with said cylindrical fiber core comprised of said lower refractive index material and said at least one concentric shell comprised of said higher refractive index material, said higher refractive index material having a refractive index $n_h$ and said lower refractive index material having a refractive index $n_L$, said higher and lower refractive indexes and said higher refractive index shell thickness t satisfying a relationship given by $t(n_h^2-n_L^2)^{1/2}<\lambda/2$, wherein $\lambda$ is a wavelength of light propagating in said optical fiber.

23. The multimode optical fiber according to claim 22 wherein said at least one concentric shell is a plurality of concentric shells including shells having said high refractive index materials of said thickness t spaced from each other by shells of thickness $\Delta$ comprising said lower refractive index material, wherein $\Delta>5\lambda$.

24. The multimode optical fiber according to claim 22 wherein said core has a radius of at least about $15\lambda$.

25. The multimode optical fiber according to claim 23 wherein said core has a radius of at least about $15\lambda$.

26. The multimode optical fiber according to claim 23 wherein each of said high refractive index shells includes a grating written therein, said grating including a selected refractive index modulation along a length of said fiber.

27. The multimode optical fiber according to claim 24 wherein each of said high refractive index shells includes a grating written therein, said grating including a selected refractive index modulation along a length of said fiber.

28. The multimode optical fiber according to claim 25 wherein each of said high refractive index shells includes a grating written therein, said grating including a selected refractive index modulation along a length of said fiber.

29. The multimode optical fiber according to claim 26 said grating is selected from the group consisting of apodized gratings, chirped gratings, chirped Moiré gratings and long period gratings.

30. The multimode optical fiber according to claim 27 said grating is selected from the group consisting of apodized gratings, chirped gratings, chirped Moiré gratings and long period gratings.

31. The multimode optical fiber according to claim 28 said grating is selected from the group consisting of apodized gratings, chirped gratings, chirped Moiré gratings and long period gratings.

32. An apparatus for Raman spectroscopy, comprising:
 a light source for producing a light of selected wavelengths;
 a multimode optical fiber having opposed ends and being connected at one end thereof to said light source, said multimode optical fiber comprising:
  a cylindrical fiber core and a plurality of concentric shells, the cylindrical fiber core and said plurality of concentric shells comprised of alternating higher and lower refractive index materials with said cylindrical fiber core comprised of said lower refractive index material, said higher refractive index material having a refractive index $n_h$ and said lower refractive index material having a refractive index $n_L$, said higher refractive index shells having a thickness t, said higher and lower refractive indexes and said higher refractive index shell thickness t satisfying a relationship given by $t(n_h^2 - n_L^2)^{1/2} < \lambda/2$, wherein $\lambda$ is a wavelength of light propagating in said optical fiber, wherein each of said high refractive index shells includes a grating written therein, said grating comprising a selected refractive index modulation along a length of said fiber; and
 detection means optically coupled to said multimode optical fiber for detecting light scattered by Raman spectroscopy incident on the other end of said multimode optical fiber.

33. The multimode optical fiber according to claim 32 wherein said concentric shells having the lower refractive index $n_L$ have a thickness $\Delta$, and wherein $\Delta > 5\lambda$.

34. The multimode optical fiber according to claim 33 wherein said core has a radius of at least about $15\lambda$.

35. The multimode optical fiber according to claim 34 wherein said fiber core has a radius of about $25\lambda$, wherein $\lambda$ is the vacuum wavelength, and $\Delta$ is at least $10\lambda$.

36. The apparatus according to claim 32 said grating is selected from the group consisting of apodized gratings, chirped gratings, chirped Moiré gratings and long period gratings.

37. The apparatus according to claim 33 said grating is selected from the group consisting of apodized gratings, chirped gratings, chirped Moiré gratings and long period gratings.

38. The apparatus according to claim 34 said grating is selected from the group consisting of apodized gratings, chirped gratings, chirped Moiré gratings and long period gratings.

* * * * *